(12) United States Patent
Narasimha et al.

(10) Patent No.: US 9,135,569 B2
(45) Date of Patent: Sep. 15, 2015

(54) NAVIGATION SYSTEM WITH ANOMALY DETECTION MECHANISM AND METHOD OF OPERATION THEREOF

(71) Applicant: TeleNav, Inc., Sunnyvale, CA (US)

(72) Inventors: Pramod Lakshmi Narasimha, Sunnyvale, CA (US); Aliasgar Mumtaz Husain, Milpitas, CA (US)

(73) Assignee: TELENAV, INC., Sunnyvale, CA (US)

( * ) Notice: Subject to any disclaimer, the term of this patent is extended or adjusted under 35 U.S.C. 154(b) by 307 days.

(21) Appl. No.: 13/757,509

(22) Filed: Feb. 1, 2013

(65) Prior Publication Data
US 2014/0222723 A1    Aug. 7, 2014

(51) Int. Cl.
   G06N 99/00    (2010.01)
   G01C 21/32    (2006.01)
   G06N 5/00     (2006.01)
   G06N 5/02     (2006.01)

(52) U.S. Cl.
   CPC ............. *G06N 99/005* (2013.01); *G01C 21/32* (2013.01); *G06N 5/00* (2013.01); *G06N 5/02* (2013.01); *G06N 5/025* (2013.01)

(58) Field of Classification Search
   None
   See application file for complete search history.

(56) References Cited

U.S. PATENT DOCUMENTS

| 2009/0070028 A1 | 3/2009 | Hempel |
| 2009/0171558 A1 | 7/2009 | Davis et al. |
| 2010/0153348 A1 | 6/2010 | Perczynski et al. |

OTHER PUBLICATIONS

Cheng, Outlier Management in Intelligent Data Analysis, Doctoral Thesis, University of London, Sep. 2000, pp. 1-163.*

* cited by examiner

*Primary Examiner* — Wilbert L Starks
(74) *Attorney, Agent, or Firm* — IP Investment Law group (57) ABSTRACT

A method of operation of a navigation system includes: determining a classification model for a target field for assessing a point of interest; determining a cluster for the target field for assessing the point of interest; and determining an anomaly based on the classification model and the cluster for displaying on a device.

20 Claims, 5 Drawing Sheets

FIG. 5

NAVIGATION SYSTEM WITH ANOMALY DETECTION MECHANISM AND METHOD OF OPERATION THEREOF

TECHNICAL FIELD

An embodiment of the present invention relates generally to a navigation system, and more particularly to a navigation system for detecting anomalies.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is regarding use of locations of interest for navigation systems. However, such navigations systems can have errors or anomalies.

Thus, a need still remains for a navigation system with anomaly detection mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: determining a classification model for a target field for assessing a point of interest; determining a cluster for the target field for assessing the point of interest; and determining an anomaly based on the classification model and the cluster for displaying on a device.

An embodiment of the present invention provides a navigation system, including: a supervised learning module for determining a classification model for a target field for assessing a point of interest; a clustering module, coupled to the supervised learning module, for determining a cluster for the target field for assessing the point of interest; and an evaluation module, coupled to the clustering module, for determining an anomaly based on the classification model and the cluster for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
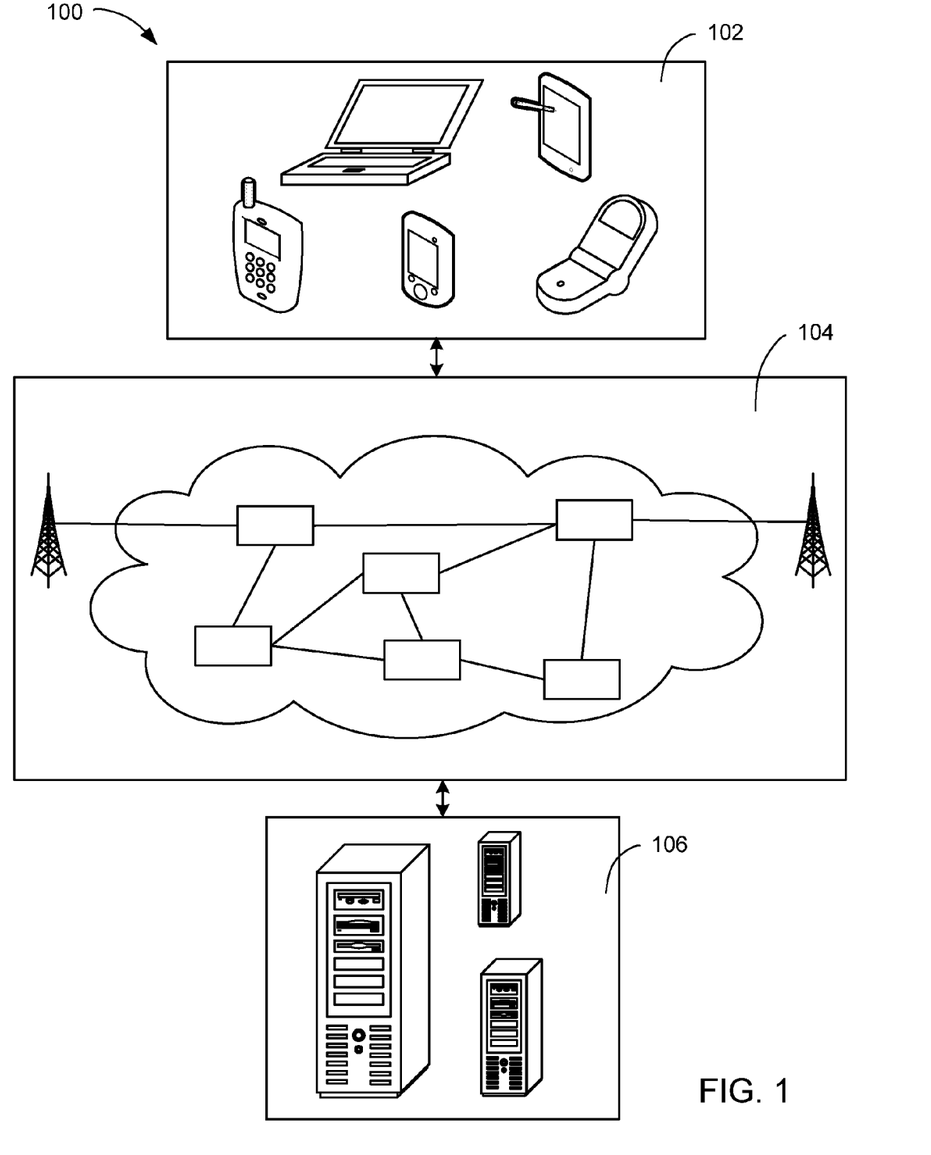
FIG. 1 is a navigation system with anomaly detection mechanism in an embodiment of the present invention.

Referring now to FIG. 1, therein is shown a navigation system 100 with anomaly detection mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the communication path 104 to communicate with the second device 106 or can be a standalone device. The first device 102 further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (lrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
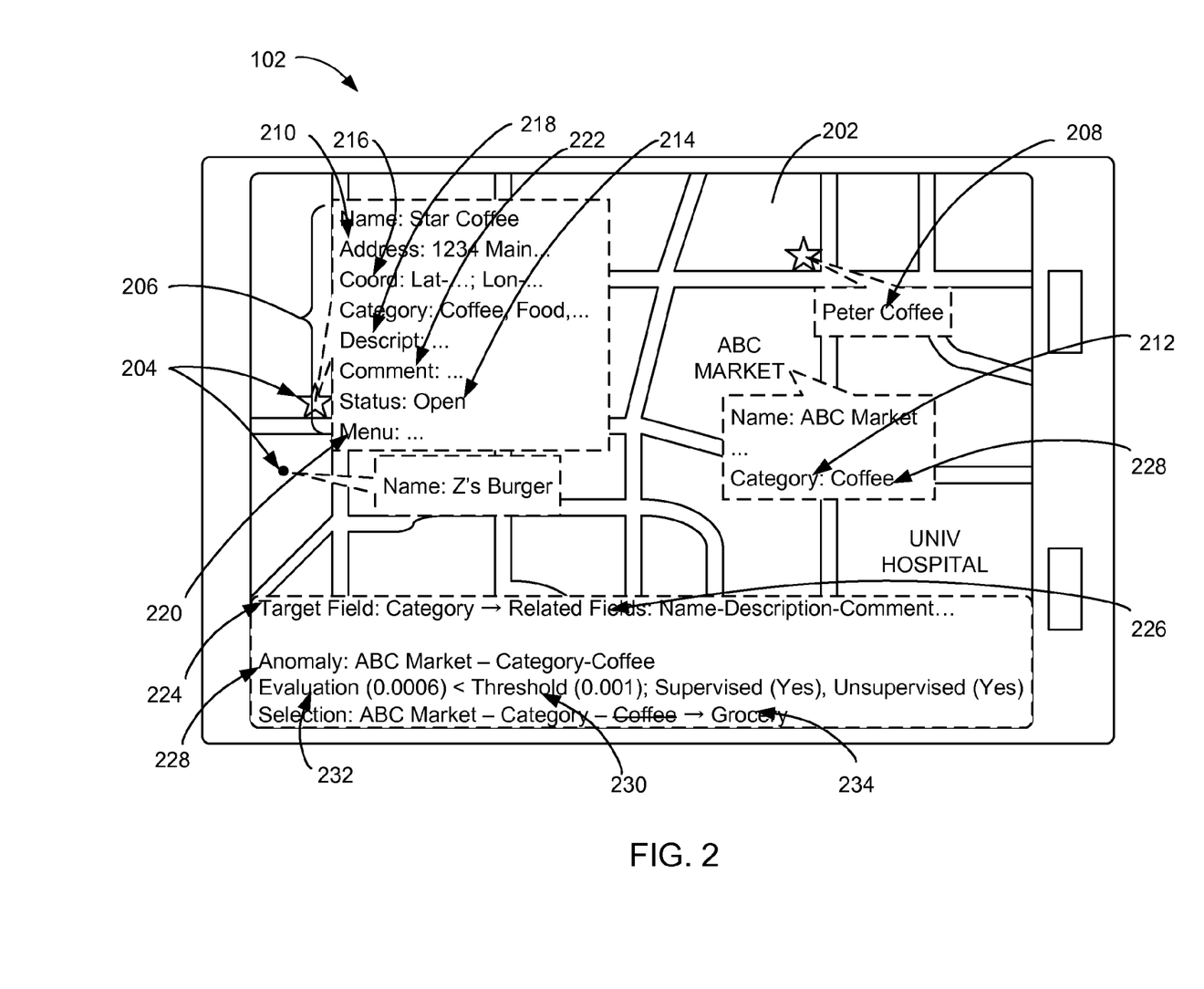
FIG. 2 is an example of a display interface of the first device of FIG. 1.

Referring now to FIG. 2, therein is shown an example of a display interface 202 of the first device 102 of FIG. 1. The display interface 202 can show a point of interest 204. The point of interest 204 can be a specific geographical location that a user may find useful or interesting. The point of interest 204 can be a location determined by the navigation system 100. For example, the point of interest 204 can be predetermined based on one or more entity existing at the location, such as a business or a residence, popularity of the location with other users, social significance associated with the location, such as historical sites or scenic points, or a combination thereof.

The point of interest 204 can have data-fields 206. The data-fields 206 are defined as individual sets of information regarding the point of interest 204. Each of the data-fields 206 for the point of interest 204 can be a particular type of information regarding the point of interest 204. Each of the data-fields 206 for the point of interest 204 can be different from each other.

For example, the data-fields 206 can include a name 208, an address 210, a category 212, a status 214, coordinates 216, a description 218, a menu 220, a comment 222, or a combination thereof regarding the point of interest 204. The name 208 can be a letter, a symbol, a number, or a combination thereof identifying the point of interest 204. The name 208 of the point of interest 204 can be a business name, a brand name, such as Starbucks™ or Apple™ store, a residence name, name of the tourist attraction, name of the physical location, such as Santa Monica beach or San Francisco, a user-assigned name, such as home or work, or a combination thereof.

The address 210 can be a letter, a symbol, a number, or a combination thereof identifying a physical location of an entity located at the point of interest 204 according to a system of locally used location identifiers. The address 210 can identify the physical location of a structure, such as a room or a building, or a business, a residence, an affinity or functional group, or a combination thereof associated with the structure. The address 210 can identify the physical location using a structural identifier, such as a building name or a house number, street names or numbers, region names, such as city, county, state, province, country, postal regions, or a combination thereof, or a combination of identifiers thereof.

The category 212 can be a type or a classification associated with the point of interest 204 from a set of types or classifications. For example, the point of interest 204 having the name 208 of Starbucks™ can have the category 212 of "restaurant", "coffee", or a combination thereof. Also for example, the point of interest 204 having the name 208 of Golden Gate Bridge can have the category 212 of "landmark", "tourist attraction", "scenic location", road segment, or a combination thereof.

The status 214 can be a state of the point of interest 204 at a particular time. The status 214 can be an operational state, such as open or closed for business or access by the user. The status 214 can be based on the state at a current time or a time associated with a search or inquiry by the user.

The coordinates 216 can be a letter, a symbol, a number, or a combination thereof identifying a physical location of the point of interest 204 according to a mapping system. The coordinates 216 can be navigation information based on the latitude-longitude mapping system or the global positioning system (GPS).

The description 218 is defined as a series of letters, numbers, symbols, or a combination thereof for characterizing an entity associated with the point of interest 204. The description 218 can be a description or classification for a business, a building, a group, or a combination thereof that owns, operates, resides, or a combination thereof for the point of interest 204. For example, the description 218 can be distinctions based on standard industrial classification (SIC) or the North American Industry Classification System (NAICS) code for characterizing the business, the building, the group, or a combination thereof associated with the point of interest 204.

The menu 220 is defined as a list of choices associated with the point of interest 204. The menu 220 can be a food menu for an instance of a restaurant for the point of interest 204. The menu 220 can be a list of service or product, price, or a combination thereof available at the point of interest 204.

The comment 222 can be information from the user or other users associated with the point of interest 204. For example, the comment 222 can be a note, a review, a rating, or a combination thereof from the user of the first device 102 or other users of the navigation system 100.

The display interface 202 can further show a target field 224 and a related field 226. The target field 224 can be an instance of the data-fields 206 being evaluated by the navigation system 100. The target field 224 can be the subject of evaluation, determination, correction, or a combination thereof. The related field 226 can be a different instance of the data-fields 206 associated with the target field 224. The related field 226 can have information that can be used to verify the target field 224.

For example, the target field 224 can be the category 212 and the related field 226 can be the name 208, the description 218, the comment 222, or a combination thereof. As a more specific example, when the target field 224 is "coffee", associated items such as "coffee" or "café" in the name 208, the description 218, the comment 222, or a combination thereof can be used to verify the category 212.

The display interface 202 can also show an anomaly 228, an anomaly-threshold 230, an evaluation measure 232, and a content response 234. The anomaly 228 is defined as deviation from the normal in one or more of the data-fields 206 for one or more instances of the point of interest 204.

The anomaly 228 can be in relation to other instances of the point of interest 204. For example, the anomaly 228 can be an instance of "Peter Coffee" having the category 212 of "grocery" when more than half of the other instances having "Peter Coffee" in the name 208 also has "coffee" in the category 212.

The anomaly 228 can also be in relation to a standardized or known correct value. The anomaly 228 can be an instance of the point of interest 204 or an instance of the data-fields 206 therein that is different from known correct value. For example, the instances of point of interest 204 having the name 208 of "ABC Market" can be known or standardized to have the category 212 of "grocery" to the navigation system 100. The anomaly 228 can be instances of the point of interest 204 or the category 212 having "coffee" or any value different from "grocery".

The anomaly 228 can be determined using the anomaly-threshold 230 and the evaluation measure 232. The evaluation measure 232 is defined as a measureable attribute of the point of interest 204 or of one or more of the data-fields 206 therein for verifying the point of interest 204 and determining the anomaly 228.

The anomaly-threshold 230 is defined as a limit for determining the anomaly 228. The navigation system 100 can compare the evaluation measure 232 and the anomaly-threshold 230 to determine the anomaly 228. Details regarding the determination of the anomaly 228 will be discussed below.

The content response 234 is defined as information received by the navigation system 100 in response to the determination of the anomaly 228. The content response 234 can be input from the user, such as a selection of the point of interest 204 or a correction for the anomaly 228. The content response 234 can further be a correction by the navigation system 100.

Figure 3:
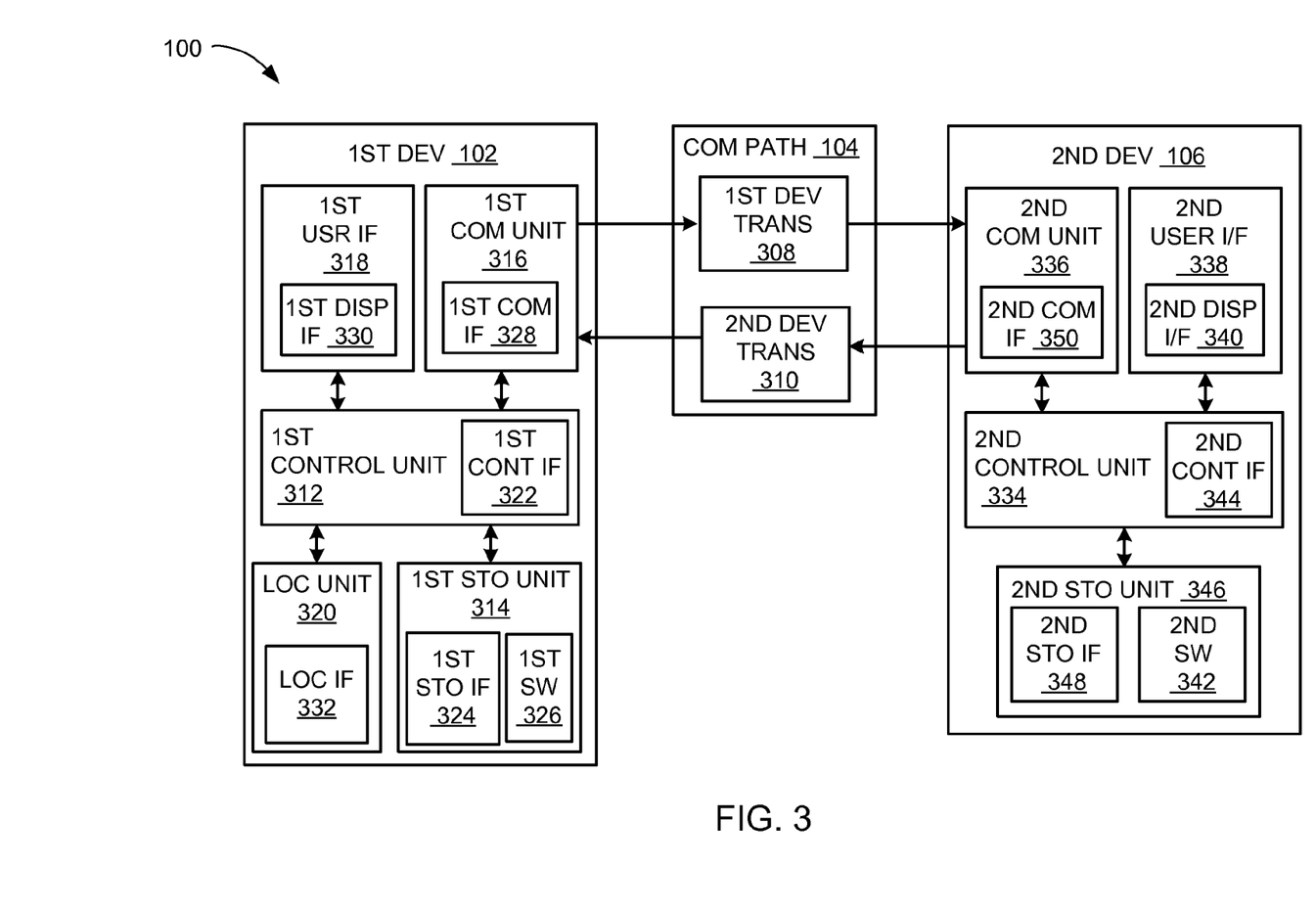
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318, and a location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The location unit 320 can generate location information, current heading, current acceleration, and current speed of the first device 102, as examples. The location unit 320 can be implemented in many ways. For example, the location unit 320 can function as at least a part of GPS, an inertial navigation system, a cellular-tower location system, a pressure location system, or any combination thereof. Also, for example, the location unit 620 can utilize components such as an accelerometer or GPS receiver.

The location unit 320 can include a location interface 332. The location interface 332 can be used for communication between the location unit 320 and other functional units in the first device 102. The location interface 632 can also be used for communication external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control unit 312.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
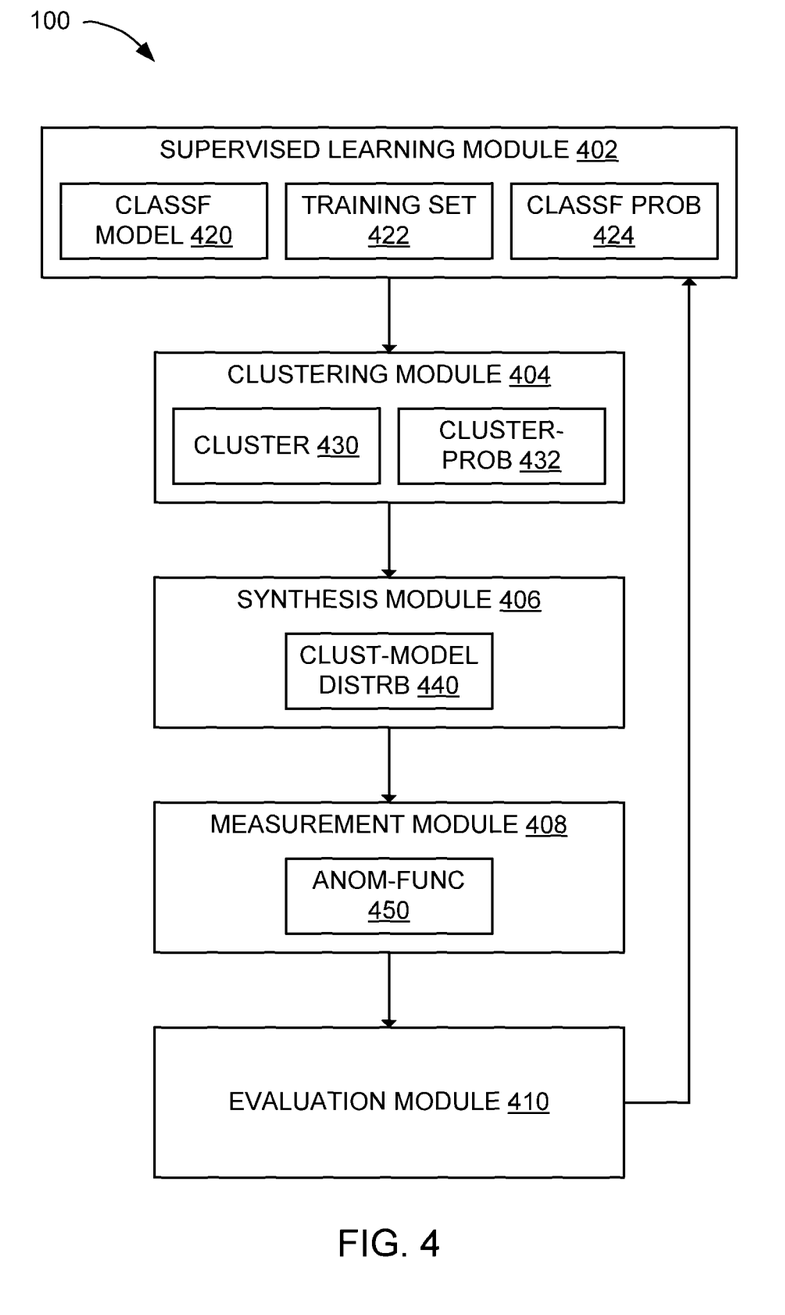
FIG. 4 is a control flow of the navigation system.

Referring now to FIG. 4, therein is shown a control flow of the navigation system 100. The navigation system 100 can include a supervised learning module 402, a clustering module 404, a synthesis module 406, a measurement module 408, and an evaluation module 410.

The supervised learning module 402 can be coupled to the clustering module 404 using wired or wireless connections, by having an output of one module as an input of the other module, by having operations of one module influence operation of the other module, or a combination thereof. Similarly, the clustering module 404 can be coupled to the synthesis module, the synthesis module 406 can be coupled to the measurement module 408, and the measurement module 408 can be coupled to the evaluation module 410. The evaluation module 410 can be further coupled to the supervised learning module 402.

The supervised learning module 402 is for determining a classification model 420 from instances of the point of interest 204 of FIG. 2. The classification model 420 is defined as a method of identifying a sub-group of associated data within a larger set of data. The classification model 420 can be groups of the point of interest 204 having same or related values within corresponding instances of the data-fields 206 of FIG. 2.

For example, the classification model 420 can be based on types, such as groups of the point of interest 204 having the same instances of the category 212, such as "coffee" or "grocery". Also for example, the classification model 420 can be based on integer or Boolean value, such as whether a specific letter, number, symbol, or a combination thereof is included in the data-fields 206 of the point of interest 204 or based on the number of occurrences.

The supervised learning module 402 can determine the classification model 420 by identifying a training set 422 for assessing one or more instances of the point of interest 204. The training set 422 is defined as a set of data used to discover associations or relationships between instances of the point of interest 204. The supervised learning module 402 can identify the training set 422 using the target field 224 of FIG. 2 as a target or output and the related data-fields 206 as input.

For example, q can represent a number of the data-fields 206 in the data. The training set 422 can be represented as $\{x^g_i, y^g_i : 1 \leq i \leq N_g\}$ where $x^g_i$ is a feature vector consisting of features formed by related data-fields 206 of the point of interest 204, represented by $\mathcal{F}$, and $y^g_i \in \{1, 2, \ldots, q\}$ is the target field 224 of the point of interest 204.

The training set 422 can also be a predetermined set of data for determining relationships, potentially predictive relationships, or a combination thereof between existing instances, new instances, or a combination thereof for the point of interest 204 or the data-fields 206 therein.

The supervised learning module 402 can identify the training set 422 using predetermined identification. For example, the supervised learning module 402 can identify the data having a specific header, bit value, stored in a specific location, communicated using a known protocol, or a combination thereof as the training set 422. The navigation system 100 can predetermine the training set 422, the identification method, or a combination thereof.

The supervised learning module 402 can use the training set 422 to determine the classification model 420 for assessing one or more instances of the point of interest 204. The supervised learning module 402 can determine patterns, equations, groupings, or a combination thereof based on the input and output relationships specified in the training set 422. The supervised learning module 402 can use probability calculations between the input and output portions in the training set 422, maximization functions, risk minimization methods, or a combination thereof to determine the classification model 420 from the training set 422.

Continuing with the above example, the supervised learning module 402 can use the training set 422 to train the classification model 420, represented by:

$$\mathcal{M} = \{\mathcal{M}_1, \mathcal{M}_2, \ldots, \mathcal{M}_q\}. \quad \text{Equation (1)}.$$

For Equation (1), $\mathcal{M}_i$ can be a binary classifier for an instance of the data-fields 206, represented by i. The classification model 420 can be probabilistic in nature and be represented by a classification probability 424.

The classification probability 424 is defined as a representation of strength or certainty that a certain input data belongs to a particular instance of the data-fields 206 based on the training set 422. The supervised learning module 402 can calculate the classification probability 424 using a total number of the data-fields 206, relationship between the data-fields 206, values in the data-fields 206, such as matching or related keywords, methods or equations predetermined by the navigation system 100, or a combination thereof.

Continuing with the example, the classification probability 424 can be represented as:

$$\mathcal{M}_i(x) = p_i. \quad \text{Equation (2)}.$$

For Equation (2), $p_i$ can be the probability of input x belonging to an instance of the data-fields 206 represented by i, such as the target field 224. The classification model 420 can be represented using the classification probability 424, with the output of or designation by the classification model 420 representing the probability of input belonging to the target field 224. The classification model 420 can further be represented using the classification probability 424 as:

$$\mathcal{M}(x) = \{p_1, p_2, \ldots, p_c\}. \quad \text{Equation (3)}.$$

The classification model 420 can be used to identify a particular instance of the point of interest 204. For example, the navigation system 100 can look for an overlap in the classification model 420 for the category 212 of "coffee" and the classification model 420 for "within 5 miles" of current location for the first device 102 of FIG. 1.

The classification model 420 can also be used to determine values for the data-fields 206 in new instances of the point of interest 204, such as a newly opened or a business relocating to a new location. The classification model 420 can also be used to determine values for new or incorrect instances of the data-fields 206 in instances of the point of interest 204. For example, the navigation system 100 can use the classification model 420 to assign "coffee" to a new instance of "Peter Coffee" or to find the anomaly 228 of FIG. 2 for the target field 224 in all instances of the point of interest 204.

The supervised learning module 402 can use the first control unit 312 of FIG. 3, the second control unit 334 of FIG. 3, or a combination thereof to determine the classification model 420, calculate the classification probability 424, or a combination of the processes thereof. The supervised learning module 402 can store the classification model 420, classification probability 424, or a combination in the first storage unit 314 of FIG. 3, the second storage unit 346 of FIG. 3, or a combination thereof.

After determining the classification model 420, calculating the classification probability 424, or a combination thereof, the control flow can pass from the supervised learning module 402 to the clustering module 404. The control flow can pass by having the classification model 420, the classification probability 424, or a combination thereof as an output from the supervised learning module 402 to an input of the clustering module 404, storing the classification model 420, the classification probability 424, or a combination thereof at a location known and accessible to the clustering module 404, by notifying the clustering module 404, such as by using a flag, an interrupt, a status signal, or a combination thereof, or a combination of processes thereof.

The clustering module 404 is for determining a cluster 430 from instances of the point of interest 204, the data-fields 206 therein, or a combination thereof. The cluster 430 is defined as a grouping of data, such as the point of interest 204 or the data-fields 206 therein, based on associations and relationships observed between the data without any guidelines. The group of data in one instance of the cluster 430 can me more similar or associated with each other than a different group of data in a different instance of the cluster 430.

The cluster 430 can be probabilistic in nature and be represented by a cluster-distribution 432. The cluster-distribution 432 is defined as a representation of strength or certainty that a certain input data belongs to a particular instance of the data-fields 206 without any guidelines. The clustering module 404 can determine the cluster 430, the cluster-distribution 432, or a combination thereof independent of the training set 422.

For example, K can denote a total number of all instances of the cluster 430. The instances of the cluster 430 can be represented as:

$$\mathcal{C} = \{\mathcal{C}_1, \mathcal{C}_2, \ldots, \mathcal{C}_K\}. \quad \text{Equation (4)}.$$

For a given input x, the probability of x belonging to an instance of the cluster 430 $k$, denoted by the cluster-distribution 432, can be represented as:

$$\mathcal{C}_k(x) = d_k. \quad \text{Equation (5)}.$$

The cluster 430 can be represented using the cluster-distribution 432 of x represented as:

$$\mathcal{C}(x) = \{d_1, d_2, \ldots, d_K\}. \quad \text{Equation (6)}.$$

The clustering module 404 can calculate the cluster-distribution 432 and determine the cluster 430 using a total number of the data-fields 206, relationship between the data-fields 206, values in the data-fields 206, such as matching or related keywords, methods or equations predetermined by the navigation system 100, or a combination thereof.

The clustering module 404 can use statistical data analysis to determine the cluster 430 and calculate the cluster-distribution 432. The clustering module 404 can use a total number of the data-fields 206, relationship between the data-fields 206, values in the data-fields 206, such as matching or related keywords, methods or equations predetermined by the navigation system 100, or a combination thereof.

For example, the clustering module 404 can calculate densities between various groupings of the point of interest 204, the data-fields 206 therein, or a combination thereof to determine the cluster 430. As a more specific example, the cluster 430 can be a result of unsupervised learning. In contrast, the classification model 420 can be a result of supervised learning with the training set 422 as the guideline.

Also for example, clustering module 404 can calculate the cluster-distribution 432 and determine the cluster 430 using cross validation and Expectation-Maximization (EM) algorithm. The cross validation can be a method for assessing instances of the cluster 430 will generalize to an independent data set.

Continuing with the example, the clustering module 404 can use various folds in data, leave-one-out cross-validation approach, random sub-sampling, or a combination thereof for potential groupings of the data and the calculated accuracy or probability associated with the groupings. The clustering module 404 can use the cross validation to determine the grouping satisfying a standard predetermined by the navigation system 100 as the cluster 430 and the calculated accuracy, probability, size, relative distance, or a combination thereof associated with the grouping as the cluster-distribution 432.

Continuing with the example, the Expectation-Maximization algorithm can be a method for finding maximum likelihood or maximum a posteriori estimates of parameters for various groupings of data. The clustering module 404 can iteratively create a function for expectation of a likelihood using a set of the data and compute parameters maximizing the likelihood. The parameters can be used to determine a distribution of the data, which can be the cluster 430 when the distribution satisfies a standard predetermined by the navigation system 100. The calculated accuracy, probability, size, relative distance, or a combination thereof associated therewith can be the cluster-distribution 432.

The cluster 430 can be used for assessing the point of interest 204, the target field 224 therein, or a combination thereof. The cluster 430 can be used for identifying a particular instance of the point of interest 204, determine values for the data-fields 206 in new instances of the point of interest 204, determine values for new or incorrect instances of the data-fields 206 in instances of the point of interest 204, or a combination thereof similar to the classification model 420.

The clustering module 404 can use the first control unit 314, the second control unit 334, or a combination thereof to determine the cluster 430, calculate the cluster-distribution 432, or a combination of processes thereof. The clustering module 404 can store the cluster 430, the cluster-distribution 432, or a combination thereof in the first storage unit 314, the second storage unit 346, or a combination thereof.

After determining the cluster 430, calculating the cluster-distribution 432, or a combination thereof, the control flow can pass from the clustering module 404 to the synthesis module 406. The control flow can pass similarly as described above between the supervised learning module 402 and the clustering module 404.

For illustrative purposes, the clustering module 404 is described as processing after the supervised learning module 402. However, it is understood that the navigation system 100 can be different. For example, the clustering module 404 can process before the supervised learning module 402 or in parallel with the supervised learning module 402.

Continuing with the example, the control flow can pass from the clustering module 404 to the supervised learning module 402 and then to the synthesis module 406. The control flow can also pass from the clustering module 404 to the synthesis module 406, from the supervised learning module 402 to the synthesis module 406, or a combination thereof.

The synthesis module 406 is for estimating a cluster-model distribution 440. The cluster-model distribution 440 is defined as a probability distribution of each instance of the data-fields 206 against each instances of the cluster 430. The cluster-model distribution 440 can be for determining the anomaly 228.

The cluster-model distribution 440 can be a matrix. The cluster-model distribution 440 can be represented as:

$$D(i, k) = \frac{\sum_{j: y_j^g = i} C_k(x_j^g) \cdot M_i(x_j^g)}{\sum_{j: y_j^g = i} M_i(x_j^g)}.$$ Equation (7)

The cluster-model distribution 440 can estimate the cluster-model distribution 440 using the training set 422, the classification model 420, the classification probability 424, the cluster 430, the cluster-distribution 432, or a combination thereof according to Equation (7).

The cluster-model distribution 440 can be normalized with respect to the data-fields 206. With $1 \leq i \leq q$ and $1 \leq k \leq K$, the cluster-model distribution 440 can be normalized such that, for each i:

$$\sum_k D(i, k) = 1.$$ Equation (8)

It has been discovered that the cluster-model distribution 440 provides a method to combine and simultaneously evaluate results of both supervised and unsupervised learning processes. The cluster-model distribution 440 provides the ability to combine and evaluate by mathematically combining the cluster 430 and the classification model 420, and by normalizing with respect to the data-fields 206. It has also been discovered that the cluster-model distribution 440 based on the classification probability 424 and the cluster-distribution 432 provides a measurable expression that can be used to evaluate validity or accuracy of the data, which can be maximized to improve accuracy for the navigation system 100.

The synthesis module 406 can use the first control interface 322 of FIG. 3, the first storage interface 324 of FIG. 3, the second control interface 344 of FIG. 3, the second storage interface 348 of FIG. 3, or a combination thereof to access the classification model 420, the classification probability 424, the cluster 430, the cluster-distribution 432, or a combination thereof. The synthesis module 406 can use the first control unit 312, the second control unit 334, or a combination thereof to determine the cluster-model distribution 440. The synthesis module 406 can store the cluster-model distribution 440 in the first storage unit 314, the second storage unit 346, or a combination thereof.

After determining the cluster-model distribution 440, the control flow can pass from the synthesis module 406 to the measurement module 408. The control flow can pass similarly as described above between the supervised learning module 402 and the clustering module 404.

The measurement module 408 is for calculating the evaluation measure 232 of FIG. 2 for determining the anomaly 228. The measurement module 408 can calculate the evaluation measure 232 based on the cluster 430, the classification model 420, the classification probability 424, the cluster-distribution 432, or a combination thereof by generating an anomaly-function 450. The anomaly-function 450 is defined as a quantifiable characteristic of the point of interest 204, the data-fields 206 therein, or a combination thereof that is used for determining the anomaly 228.

The measurement module 408 can use the cluster-model distribution 440 to generate the anomaly-function 450 based on the cluster 430, the classification model 420, the classification probability 424, the cluster-distribution 432, or a combination thereof. The anomaly-function 450 can be a distance between instances of the cluster-distribution 432 of the input and the row corresponding to the target field 224 of the point of interest 204 in the cluster-model distribution 440.

The anomaly-function 450 for an instance of the point of interest 204 with respect to an instance of the data-fields 206, such as the target field 224, can be represented as:

$$\Phi_p^i = \Phi^i(x_p) = \sum_k d_k^p \cdot D(i, k).$$ Equation (9)

The distribution of the cluster 430 for an instance of the point of interest 204, represented by $x_p$, can be $\{d^p_1, d^p_2, \ldots, d^p_K\}$. The instance of the data-fields 206 can be represented by i.

For illustrative purposes, the anomaly-function 450 is described using Equation (9). However, it is understood that the anomaly-function 450 can be different. For example, the anomaly-function 450 can be any function that combines the cluster-model distribution 440 and the distribution of the cluster 430 to produce probabilistic output.

The measurement module 408 can calculate the evaluation measure 232 using the anomaly-function 450. The measurement module 408 can set the target field 224, an instance or a set for the point of interest 204, or a combination thereof as an input to the anomaly-function 450 and set the output thereof as the evaluation measure 232.

It has been discovered that the anomaly-function 450 and the evaluation measure 232 provide improved accuracy for the navigation system 100. The anomaly-function 450 and the evaluation measure 232 provide improved accuracy by providing a measurable characteristic representing uncharacteristic data and by combining results of two independent assessments.

After determining the anomaly-function 450 and the evaluation measure 232, the control flow can pass from the measurement module 408 to the evaluation module 410. The control flow can pass similarly as described above between the supervised learning module 402 and the clustering module 404.

The measurement module 408, the evaluation module 410, or a combination thereof can use the first control unit 312, the second control unit 334, or a combination thereof to process the data, including determining the anomaly-function 450, the evaluation measure 232, the anomaly 228, or a combination thereof. The measurement module 408, the evaluation module 410, or a combination thereof can store e anomaly-function 450, the evaluation measure 232, the anomaly 228, or a combination thereof in the first storage unit 324, the second storage unit 346, or a combination thereof.

The evaluation module 410 is for determining the anomaly 228. The evaluation module 410 can determine the anomaly 228 based on the classification model 420 and the cluster 430, the cluster-model distribution 440, or a combination thereof. The evaluation module 410 can determine the anomaly 228 by comparing the evaluation measure 232, calculated from the anomaly-function 450, and the anomaly-threshold 230 of FIG. 2.

The evaluation module 410 can determine the point of interest 204 or the target field 224 therein as the anomaly 228 when the evaluation measure 232 is less than the anomaly-threshold 230. The anomaly-threshold 230 can vary for different problems, consequential or contextual factors, inputs and outputs, instances of the data-fields 206, instances of the point of interest 204, or a combination thereof. As an example range, the anomaly-threshold 230 can have a value between and including 0.01 and 0.0001.

For an example of the overall process, the navigation system 100 can have "Star Coffee", "Peter Coffee", "Z's Burgers", "ABC Market", and "University Hospital" for the name 208 of FIG. 2 for various instances of the point of interest 204. The clustering module 404 can determine instances of the cluster 430 based on the name 208, the category 212, any of the data-fields 206, or a combination thereof.

Continuing with the example, the navigation system 100 can have five clusters {C1, C2, C3, C4, C5} in the training set 422. The cluster 430 C1 can be all instances of the point of interest 204 having "Star Coffee" in the name 208. The cluster 430 C2 can be all instances of the point of interest 204 having "Peter Coffee" in the name 208. The cluster 430 C3 can be all instances of the point of interest 204 having "burgers" in the category 212. The cluster 430 C4 can be all instances of the point of interest 204 having "ABC Market" in the name 208. The cluster 430 C5 can be all instances of the point of interest 204 having "hospitals" in the category 212.

Continuing with the example, the supervised learning module 402 can identify the training set 422 to have C1 and C2 as positives and C3, C4, and C5 as negatives for the target field 224 of the category 212 having the value "coffee". The supervised learning module 402 can determine the classification model 420 using the training set 422.

Continuing with the example, the synthesis module 406 can use the outputs of the supervised learning module 402 and the clustering module 404 to determine the cluster-model distribution 440. The cluster-model distribution 440 can be calculated to have the values of:

$$D = \begin{bmatrix} 0.6 & 0.4 & 0 & 0 & 0 \\ 0 & 0 & 0.3 & 0.4 & 0.3 \end{bmatrix}.$$

A top row of the cluster-model distribution 440 can represent the distribution of positive instances of the point of interest 204 across instances of the cluster 430 and a bottom row can represent the distribution of negative instances of the point of interest 204 across instances of the cluster 430.

Continuing with the example, the measurement module 408 can calculate the evaluation measure 232 for an instance of "Peter Coffee" belonging to C2 with the cluster-distribution 432 of {0.01, 0.99, 0, 0, 0}. The evaluation measure 232 can be the dot product of top row of the cluster-model distribution 440 and the cluster-distribution 432, which gives a value of 0.402. The evaluation module 410 can compare the evaluation measure 232 to the anomaly-threshold of 0.001 and determine the instance of "Peter Coffee" as not being the anomaly 228.

Continuing with the example, the navigation system 100 can calculate the evaluation measure 232 for an instance of "Z's Burgers" belonging to C3 with the cluster-distribution 432 of {0, 0, 0.98, 0.01, 0.01}. The evaluation measure 232 can be 0.301 and the navigation system 100 can determine the instance of "Z's Burgers" as not being the anomaly 228.

Continuing with the example, the navigation system 100 can calculate the evaluation measure 232 for an instance of "ABC Market" belonging to C4 and having "Coffee" for the category 212 with the cluster-distribution 432 of {0.001, 0, 0.09, 0.9, 0.009}. The evaluation measure 232 can be 0.0006 and the navigation system 100 can determine the instance of "ABC Market" as being the anomaly 228 since the evaluation measure 232 is less than the anomaly-threshold.

The evaluation module 410 can further determine the content response 234 of FIG. 2 based on the anomaly 228. The evaluation module 410 can determine the content response 234 by generating a notice regarding the anomaly 228 and communicating the anomaly 228 to the user.

The navigation system 100 can communicate the anomaly 228 using the first user interface 318, the second user interface 338, or a combination thereof. The navigation system 100 can display or audibly generate a notice message having the anomaly 228, the target field 224, corresponding instance of the point of interest 204, the anomaly-threshold 230 and the evaluation measure 232, or a combination thereof for communicating to the user.

The evaluation module 410 can determine a response from the user as the content response 234. For example, the user can choose to correct the anomaly 228 and input a new set of corrected data for the target field 224 in the corresponding instance of the point of interest 204. Also for example, the user can correct the determination of the anomaly 228 and affirm the existing data. The evaluation module 410 can determine the input for correcting the data or affirming the data, the corrected or confirmed instance of the point of interest 204, the data-fields 206 therein, or a combination thereof as the content response 234.

The evaluation module 410 can also determine the content response 234 when the user selects the corresponding instance of the point of interest 204 having the anomaly 228. The evaluation module 410 can determine the content response 234 as a confirmation when the user selects the particular instance of the point of interest 204 based on a search using the target field 224.

For example, the user can search for "coffee". The navigation system 100 can return "ABC Market" as one of the results based on the category 212 matching "coffee". The evaluation module 410 can determine the name 208 of "ABC Market" and the category 212 of "Coffee" belonging to one instance of the point of interest 204 as the anomaly 228. However, the evaluation module 410 can determine the content response 234 as confirming the existing data if the user selects "ABC Market" following a search based on the category 212 matching "coffee".

For illustrative purposes, the navigation system 100 is described above as processing the instances of the point of interest 204 for the target field 224 of the category 212. However, it us understood that the above described processes can be performed for any instance of the data-fields 206 as the target field 224. For example, the target field 224 can be the name 208 of FIG. 2, the address 210 of FIG. 2, the status 214 of FIG. 2, the coordinates 216 of FIG. 2, the description 218 of FIG. 2, the menu 220 of FIG. 2, the comment 222 of FIG. 2, or a combination thereof.

After determining the content response 234, the control flow can pass back to the supervised learning module 402. The control flow can pass similarly as described above between the supervised learning module 402 and the clustering module 404.

The supervised learning module 402 can use the content response 234 to further identify the training set 422. The supervised learning module 402 can further identify by including the content response 234, the associated data for the corresponding instance of the point of interest 204, or a combination thereof in the training set 422. The navigation system 100 can capture user behavior and feedback from the user through the content response 234 for further improving accuracy and for providing personalization of the navigation system 100.

The navigation system 100 has been described with module functions or order as an example. The navigation system 100 can partition the modules differently or order the modules differently. For example, functions of the synthesis module 406 and the measurement module 408 or measurement module 408 and the evaluation module 410 can be combined. Also for example, the clustering module 404 can execute before or in parallel with the supervised learning module 402.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively.

The physical transformation from the data-fields 206 in the point of interest 204 and associated changes in the cluster 430 and the classification model 420, such as a change in business at an existing location, results in the movement in the physical world, such as user searching for or traveling to the point of interest 204. Movement in the physical world results in changes to the target field 224 in the point of interest 204 by capturing the user interaction through the content response 234 and including in the training set 422.

Figure 5:
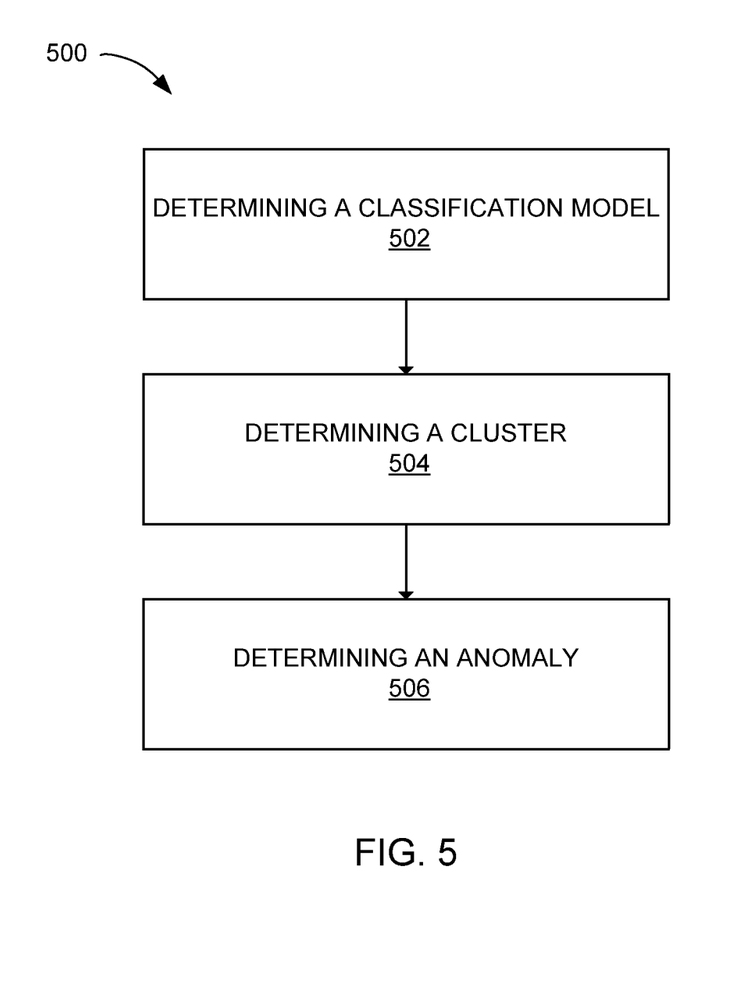
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: determining a classification model for a target field for assessing a point of interest in a block 502; determining a cluster for the target field for assessing the point of interest in a block 504; and determining an anomaly based on the classification model and the cluster for displaying on a device in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
   determining a classification model for a target field for assessing a point of interest;
   determining a cluster for assessing the point of interest; and
   determining an anomaly with a control unit based on the classification model and the cluster for displaying on a device.

2. The method as claimed in claim 1 further comprising estimating a cluster-model distribution based on the classification model and the cluster for determining the anomaly.

3. The method as claimed in claim 1 further comprising calculating an evaluation measure based on the cluster and the classification model for determining the anomaly.

4. The method as claimed in claim 1 further comprising generating an anomaly-function based on the classification model and the cluster for determining the anomaly.

5. The method as claimed in claim 1 further comprising:
   identifying a training set for assessing the point of interest; and
   wherein:
   determining the cluster includes determining the cluster independent of the training set.

6. A method of operation of a navigation system comprising:
   identifying a training set for assessing a field of a point of interest;
   determining a classification model for a target field based on the training set;
   determining a cluster for the target field independent of the training set;
   estimating a cluster-model distribution based on the classification model and the cluster; and
   determining an anomaly with a control unit using the cluster-model distribution for displaying on a device.

7. The method as claimed in claim 6 further comprising:
   determining a content response based on the anomaly; and
   wherein:
   identifying the training set includes identifying the training set including the content response.

8. The method as claimed in claim 6 further comprising:
   calculating an evaluation measure based on the classification model; and
   wherein:
   determining the anomaly includes determining the anomaly when the evaluation measure is less than an anomaly-threshold.

9. The method as claimed in claim 6 further comprising:
   calculating a classification probability based on the classification model; and
   wherein:
   estimating the cluster-model distribution includes estimating the cluster-model distribution using the classification probability.

10. The method as claimed in claim 6 wherein further comprising:
    determining a cluster-distribution for the cluster; and
    wherein:
    estimating the cluster-model distribution includes estimating the cluster-model distribution using the cluster-distribution.

11. A navigation system comprising:
    a control unit configured to:
    determine a classification model for a target field for assessing a point of interest;
    determine a cluster for the target field for assessing the point of interest;
    determine an anomaly based on the classification model and the cluster; and
    a storage interface configured to access the classification model for determining the anomaly.

12. The system as claimed in claim 11 wherein the control unit is configured to estimate a cluster-model distribution based on the classification model and the cluster for determining the anomaly.

13. The system as claimed in claim 11 wherein the control unit is configured to calculate an evaluation measure based on the cluster and the classification model for determining the anomaly.

14. The system as claimed in claim 11 wherein the control unit is configured to generate an anomaly-function based on the classification model and the cluster for determining the anomaly.

15. The system as claimed in claim 11 wherein the control unit is configured to identify a training set for assessing the point of interest; and determine the cluster independent of the training set.

16. The system as claimed in claim 11 wherein the control unit is configured to:

estimate a cluster-model distribution based on the classification model and the cluster;

identify a training set for assessing the point of interest;

determine the cluster independent of the training set; and determine the anomaly using the cluster-model distribution.

17. The system as claimed in claim 16 wherein the control unit is configured to:

determine a content response based on the anomaly; and identify the training set including the content response.

18. The system as claimed in claim 16 wherein the control unit is configured to:

calculating an evaluation measure based on the classification model and the cluster;

determine the anomaly when the evaluation measure is less than an anomaly-threshold.

19. The system as claimed in claim 16 wherein the control unit is configured to:

calculate a classification probability based on the classification model; and estimate the cluster-model distribution using the classification probability.

20. The system as claimed in claim 16 wherein the control unit is configured to:

determine a cluster-distribution for the cluster; and estimate the cluster-model distribution using the cluster-distribution.

* * * * *